(12) United States Patent
Hegewald et al.

(10) Patent No.: US 10,457,534 B2
(45) Date of Patent: Oct. 29, 2019

(54) HEAVY-DUTY LIFT TRUCK

(71) Applicant: Konecranes Global Corporation, Hyvinkää (FI)

(72) Inventors: Mike Hegewald, Düsseldorf (DE); Lars Michael Theißen, Jüchen (DE); Heinz Ishorst, Düsseldorf (DE)

(73) Assignee: Konecranes Global Corporation, Hyvinkää (FI)

( * ) Notice: Subject to any disclaimer, the term of this patent is extended or adjusted under 35 U.S.C. 154(b) by 17 days.

(21) Appl. No.: 15/755,727

(22) PCT Filed: Oct. 27, 2016

(86) PCT No.: PCT/EP2016/075949
§ 371 (c)(1),
(2) Date: Feb. 27, 2018

(87) PCT Pub. No.: WO2017/072241
PCT Pub. Date: May 4, 2017

(65) Prior Publication Data
US 2019/0023544 A1    Jan. 24, 2019

(30) Foreign Application Priority Data
Oct. 29, 2015    (DE) .......................... 10 2015 118 535

(51) Int. Cl.
*B66F 9/075*    (2006.01)
*B60L 7/14*    (2006.01)
(Continued)

(52) U.S. Cl.
CPC ............ *B66F 9/07572* (2013.01); *B60K 6/28* (2013.01); *B60L 1/003* (2013.01); *B60L 7/26* (2013.01);
(Continued)

(58) Field of Classification Search
CPC ....... B66F 9/07572; B60L 7/14; B60G 17/005
See application file for complete search history.

(56) References Cited

U.S. PATENT DOCUMENTS

| 6,206,127 B1 | 3/2001 | Zakula, Sr. et al. |
| 6,557,658 B1 | 5/2003 | Enmeiji et al. |
| (Continued) | | |

FOREIGN PATENT DOCUMENTS

| CN | 201660015 U * | 12/2010 |
| CN | 102730604 A | 10/2012 |
| (Continued) | | |

OTHER PUBLICATIONS

Publication entitled, "Technology of New Energy Resource and Energy Saving and Emission Reduction for Modern Vehicles" by Xu Weiping, pp. 134-137, China Machine Press, the First Edition, published 2014.

(Continued)

*Primary Examiner* — Kawing Chan
*Assistant Examiner* — Cortez M Cook
(74) *Attorney, Agent, or Firm* — Gardner, Linn, Burkhart & Ondersma LLP (57) ABSTRACT

A heavy-duty lift truck designed as a mast-based apparatus comprising a mast, a load accepting means is mounted on the mast in such a way that it can be raised and lowered, and the heavy-duty lift truck is designed at least for a load capacity of 8 tons, with the heavy-duty lift truck comprising a powertrain with a travel drive that comprises an electric drive unit whereby the heavy-duty lift truck has greater energy efficiency.

14 Claims, 5 Drawing Sheets

(51) Int. Cl.
  *B60G 17/005* (2006.01)
  *B66F 9/24* (2006.01)
  *B60L 1/00* (2006.01)
  *B60L 7/26* (2006.01)
  *B60K 6/28* (2007.10)

(52) U.S. Cl.
  CPC ............ *B66F 9/24* (2013.01); *B60L 2200/42* (2013.01); *B60L 2220/12* (2013.01); *B60W 2300/121* (2013.01)

(56) References Cited

U.S. PATENT DOCUMENTS

| | | | |
|---|---|---|---|
| 7,350,840 | B2 | 4/2008 | Franzen et al. |
| 9,701,518 | B2 | 7/2017 | Rosenstrom et al. |
| 2010/0186404 | A1* | 7/2010 | Yasufuku .................. B60L 7/14 60/459 |
| 2011/0093150 | A1* | 4/2011 | Yanagisawa ........... B60K 6/365 701/22 |
| 2011/0137503 | A1 | 6/2011 | Koide et al. |
| 2012/0130576 | A1* | 5/2012 | Sugiyama ................ B60K 6/12 701/22 |
| 2013/0125540 | A1* | 5/2013 | Vainonen ................ F15B 15/00 60/413 |
| 2014/0163804 | A1* | 6/2014 | Kaneko .................... B60K 6/46 701/22 |

FOREIGN PATENT DOCUMENTS

| | | |
|---|---|---|
| CN | 102826000 A | 12/2012 |
| CN | 202609872 U | 12/2012 |
| CN | 202609873 U | 12/2012 |
| CN | 103350954 A | 10/2013 |
| CN | 103359619 A | 10/2013 |
| DE | 20001113 U1 | 3/2000 |
| DE | 10346796 A1 | 5/2005 |
| DE | 102004010988 A1 | 9/2005 |
| DE | 102004028620 A1 | 11/2006 |
| DE | 102006030945 A1 | 2/2008 |
| DE | 102006055749 A1 | 5/2008 |
| DE | 102008022487 A1 | 11/2009 |
| DE | 102008029141 A1 | 11/2009 |
| DE | 102008058847 A1 | 5/2010 |
| DE | 102011001847 A1 | 10/2012 |
| EP | 1403130 A2 | 3/2004 |
| EP | 2702003 | 3/2014 |

OTHER PUBLICATIONS

International Search Report and Written Opinion of the International Searching Authority from corresponding Patent Cooperation Treaty (PCT) Application No. PCT/EP2016/075949, indicated completed on Feb. 2, 2017.

Brochure titled "Aces for Your Stack" published by Terex prior to Oct. 29, 2015.

Preliminary Report on Patentability of the International Searching Authority in English from corresponding Patent Cooperation Treaty (PCT) Application No. PCT/EP2016/075949, completed May 1, 2018.

\* cited by examiner

HEAVY-DUTY LIFT TRUCK

CROSS REFERENCE TO RELATED APPLICATIONS

The present patent application claims the priority benefits of International Patent Application No. PCT/EP2016/075949, filed Oct. 27, 2016, and claims benefit of German patent application DE 10 2015 118 535.0, filed Oct. 29, 2015.

BACKGROUND OF THE INVENTION

The invention relates to a heavy-duty lift truck which is designed as a mast-based apparatus having a mast, wherein a load picking-up means is disposed so that it can be raised and lowered on the mast and the heavy-duty lift truck is arranged at least for a maximum load capacity of 8 t, wherein the heavy-duty lift truck comprises a power train with a travelling drive.

Heavy-duty lift trucks in terms of the present invention are vehicles which are used for handling heavy loads such as containers, in particular ISO containers, or unit loads in particular in container terminals. For this purpose such heavy-duty lift trucks are arranged for maximum load capacities of at least 8 t and up to 52 t.

Heavy-duty lift trucks generally comprise at their front end a mast serving as a lifting frame and extending substantially vertically and are thus also designated mast-based apparatuses. A load picking-up means is disposed in such a way that it can be raised and lowered along the mast at the front face of the heavy-duty lift truck and in particular at the front face of the mast.

When the heavy-duty lift truck is used as a container stacker the load picking-up means is generally referred to as a spreader which is also designated a spreader frame and can be fastened, e.g. via so-called twist locks, to standardised corner fittings of the containers to be picked up. Furthermore, in relation to container stackers, it is possible to distinguish between empty container stackers for handling empty ISO containers and full container stackers for handling ISO containers. Empty container stackers are arranged for a maximum load capacity of 8 t to 10 t and full container stackers for a maximum load capacity of 30 t to 40 t.

Alternatively, the heavy-duty lift truck can also be designed as a fork lift truck with a load picking-up means formed by fork arms. Furthermore, the load picking-up means can be designed in the form of coil tangs, magnets or locking clamps. In the case of such heavy-duty lift trucks, the maximum load capacity is 15 t to 52 t.

The heavy-duty lift trucks encompassed by the present invention are to be distinguished, on the basis of the above-described structure, in particular from straddle carrier devices which are also known as straddle carriers e.g. from the German laid-open document DE 10 2011 001 847 A1. In contrast to straddle carrier devices with load picking-up means disposed between the front and rear end of the spider-leg construction thereof, heavy-duty lift trucks cannot travel over a container or a container stack in order to pick up or set down a container but can only approach a side, in particular the long side, of a container or container stack.

The heavy-duty lift trucks in terms of the present invention are also to be distinguished from so-called reach stackers since these have no mast serving as a lifting frame but rather a jib which is generally telescopic and is oriented forwards in an inclined manner, a corresponding load picking-up means being fastened to the tip thereof. In this connection, the changeable angle between an upright and the jib is generally not less than about 20 degrees. Reach stackers with electric drives are known e.g. from CN 103 350 954 A and CN 103 359 619 A.

Furthermore, such heavy-duty lift trucks are to be distinguished from conventional fork lift trucks which are not designed or arranged to handle the above-mentioned loads and load capacity ranges. A fork lift truck of this type with a hydraulic drive is known from DE 10 2008 029 141 A1. Further fork lift trucks are known e.g. from DE 10 2008 022 487 A1, DE 10 2006 030 945 A1, DE 10 2004 028 620 A1 and DE 10 2008 058 847 A1.

From the Terex brochure "ACES FOR YOUR STACK" the operation of a heavy-duty lift truck designed as an empty container stacker by diesel-hydraulic means is known. The power train of such a heavy-duty lift truck conventionally comprises, for its travelling drive, a diesel engine and a power take-off gear which is operatively connected to a converter and an automatic transmission in order to drive the driving axle.

SUMMARY OF THE INVENTION

The present invention provides an improved heavy-duty lift truck which has a greater degree of energy efficiency.

A heavy-duty lift truck which is designed as a mast-based apparatus having a mast, wherein a load picking-up means is disposed so that it can be raised and lowered on the mast and the heavy-duty lift truck is arranged at least for a maximum load capacity of 8 t, wherein the heavy-duty lift truck comprises a power train with a travelling drive, is improved in that the travelling drive comprises an electric drive unit. Since the power consumption of the travelling drive in conventional diesel-operated heavy-duty lift trucks is about 70 percent of the total power consumption of all functions driven by the power train, the use of a travelling drive electrified in accordance with the invention means that the degree of energy efficiency of the heavy-duty lift truck can be clearly increased and therewith a reduced power loss compared with known solutions can be achieved. This advantageously leads to lower energy costs when using corresponding heavy-duty lift trucks.

In an advantageous manner provision is made that the electric drive unit is connected via an electric line to a battery, preferably a lead battery, in order to be supplied with power. This makes it possible to reduce the harmful emissions in the immediate operating environment.

Provision is made in a constructionally simple manner that a direct current power controller is connected via a second electric line to the first electric line and that a system battery and a vehicle computer are connected to the direct current power controller.

In an advantageous manner provision is made that the electric drive unit is connected via a synchronous generator and a rectifier to an internal combustion engine, in particular a diesel engine, in order to be supplied with power.

Provision is made in a constructionally simple manner that the electric drive unit comprises an assembly with a direct voltage supply bus, an inverter connected thereto, a braking resistor connected to the inverter and an electric motor which can be actuated via the inverter and is preferably designed as a three-phase asynchronous motor, and the electric motor is drivingly connected to a driving axle of the heavy-duty lift truck. In an advantageous manner, surplus power fed back from the electric motor during generative braking operation of the electric motor is absorbed via the braking resistor.

The power loss can be further reduced in that the assembly comprises a direct current power controller and a capacitor, in particular in the form of an ultra-cap, and the capacitor is connected via the direct current power controller to the direct voltage supply bus. In this way the heavy-duty lift truck can store recuperation energy produced e.g. during braking or lowering of the load picking-up means.

Provision is made in a constructionally simple manner that the power train comprises, as further drives, a steering drive, a tilting drive for tilting the mast, a lifting drive for lifting and lowering the load picking-up means, a locking drive for locking a rear axle and/or a front axle of the heavy-duty lift truck and at least one additional drive for a function of the load picking-up means.

A reliable and robust structure is achieved in that at least one of the further drives is designed as a hydraulic drive which comprises a hydraulic pump.

Provision is made in a constructionally simple manner that at least one of the further drives is connected to a power take-off gear which is operatively connected to the internal combustion engine.

The proportion of the electrification of the power train with the above-mentioned advantages is further increased in that at least one of the further drives comprises an electric drive unit with an inverter and with an electric motor which can be actuated via the inverter and is preferably designed as a three-phase asynchronous motor, and the further drive is connected via the inverter to the direct voltage supply bus.

Provision is made in a constructionally simple manner that the lifting drive is designed without hydraulic means and preferably comprises an electric drive unit with an inverter and with an electric motor which can be actuated via the inverter and is preferably designed as a three-phase asynchronous motor, and the electric drive unit is connected via the inverter to the direct voltage supply bus and the electric motor is drivingly connected to a lifting device in order to drive the lifting means thereof, preferably designed as a cable, chain or belt, and by means thereof to raise or lower the load picking-up means.

Provision is made in a constructionally simple manner that a fan is connected to the direct voltage supply bus via an inverter.

Provision is made in an advantageous manner that the heavy-duty lift truck is designed as a container stacker, in particular as an empty container stacker, the load picking-up means of which is designed as a spreader frame.

An exemplified embodiment of the invention is explained in greater detail with reference to the following description.

DESCRIPTION OF THE PREFERRED EMBODIMENTS

Figure 1:
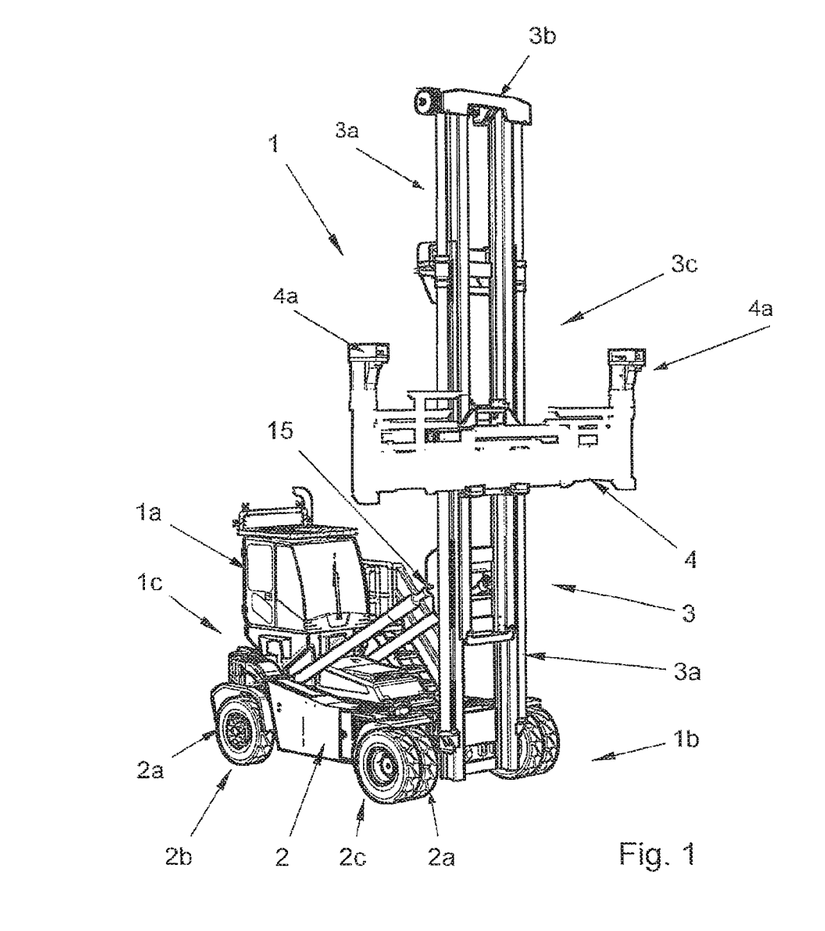
FIG. 1 shows a view of a heavy-duty lift truck.

FIG. 1 shows a schematic view of a heavy-duty lift truck 1. The heavy-duty lift truck 1 is shown as an empty container stacker by way of example in FIG. 1. However, the features of the present invention described below are applicable in the same way even when the heavy-duty lift truck 1 is not designed as an empty container stacker but e.g. as a full container stacker or fork lift truck in the sense defined in the introduction and accordingly has a different maximum load capacity range and/or a different load picking-up means.

The heavy-duty lift truck 1 essentially comprises a chassis 2, on the wheels 2a of which the heavy-duty lift truck 1 can travel freely over the ground. In this connection, the wheels 2a are preferably not provided with a solid rubber tyre arrangement but with pneumatic tyres, i.e. with a rubber tyre arrangement filled with air or other gases. The wheels 2a are disposed on a rear axle 2b and a front axle 2c. The front axle 2c preferably serves as the driving axle and the rear axle 2b as the steering axle for driving and maneuvering the heavy-duty lift truck 1. The driving axle comprises a differential gear and a planetary gear and is preferably provided with a dual tyre arrangement. Furthermore, the chassis 2 supports a driver's cabin 1a for an accompanying operator of the heavy-duty lift truck 1.

At its front end 1b of the two ends 1b, 1c of the heavy-duty lift truck 1 which are oriented in the travel direction, in particular in the region of the front axle 2c, a mast 3 serving as a lifting frame is disposed, being supported on the chassis 2. Thus, the heavy-duty lift truck 1 is also referred to as a mast-based apparatus. The mast 3 comprises two elongate supports 3a which extend with their longitudinal extension substantially along a notional vertical and are disposed in parallel with one another and are mutually spaced apart as seen in the direction of the longitudinal extension of the front axle 2c. The supports 3a are mutually connected along their longitudinal extension by means of mutually spaced transverse webs 3b in order to form the frame-like structure of the mast 3. The supports 3a can be designed to telescope in the direction of the longitudinal extension thereof.

A load picking-up means in the form of a spreader frame 4 is attached to the mast 3 and can be raised and lowered along the mast 3. In this connection, the mast 3 or the two supports 3a thereof serve as a type of guide for the load picking-up means. In this connection, the load picking-up means is disposed in the region of the front end 1b at the front face of the heavy-duty lift truck 1 and in particular at a front face 3c of the mast 3 remote from the rear end 1c of the heavy-duty lift truck 1. Furthermore, the mast 3 together with the load picking-up means is able to tilt backwards with respect to the vertical in the direction of the rear end 1c of the heavy-duty lift truck 1 towards the rear axle 2c or forwards away therefrom. In this connection, angular ranges forwards and backwards of less than 15 degrees, preferably only up to about 5 degrees, are possible so that the possible deflection clearly differs from the deflection of the jib of a reach stacker.

By means of the spreader frame 4 a container, not illustrated, in particular a so-called ISO container with standardised corner fittings, can be picked up. For this purpose, the spreader frame 4 is moved towards the container to be picked up by an appropriate action of the heavy-duty lift truck 1 in order to grip the upper corner fittings of the container. In this connection, the spreader frame 4 can engage in the upper corner fittings of the container and be locked thereto via so-called twist locks.

In the case of the heavy-duty lift truck 1 designed as an empty container stacker, the spreader frame 4 has only two locking points 4a to which a corner fitting of a container to be picked up is fastened by means of a respective twist lock.

The spreader frame 4 is in particular designed in such a way that two upper corner fittings of a long side of the corresponding container are received and in this connection the spreader frame 4 is disposed at the long side or the associated vertical side wall of the container when the container is fastened to the spreader frame 4. With its lower region of the side wall the picked-up container is not locked to the spreader frame 4 but is supported on the spreader frame 4. The spreader frame 4 thus extends substantially in a vertical plane in parallel with the side wall of the container.

As an alternative, in particular in the case of a heavy-duty lift truck 1 designed as a full container stacker, the spreader frame 4 can have four locking points 4a. In this connection all four upper corner fittings of a container can be received and the spreader frame 4 is disposed at the upper face of the container when the container is fastened to the spreader frame 4. The spreader frame 4 then extends substantially in a horizontal plane in parallel with the upper face of the container.

In the case of a heavy-duty lift truck 1 designed as an empty container stacker, the spreader frame 4 can also be designed as a so-called "double box spreader", with which two empty containers stacked one on top of the other can be picked up. In an embodiment described by way of example hereinunder, the spreader frame 4 is similar to the previously described spreader frame 4 in relation to its long-side arrangement on the side walls of the containers to be picked up. However, the corner fittings, lying one above the other on the corresponding long side, of the two containers are gripped from the outside without twist locks engaging in the corner fittings being used in this connection. Furthermore, the spreader frame 4 has two clamping holders serving as gripping elements and being mutually spaced apart in the direction of the long side, these clamping holders engaging round corner regions of the upper container. In each corner region, a clamping holder lies against the long-side side wall and the associated narrow-side side wall.

Figure 2:
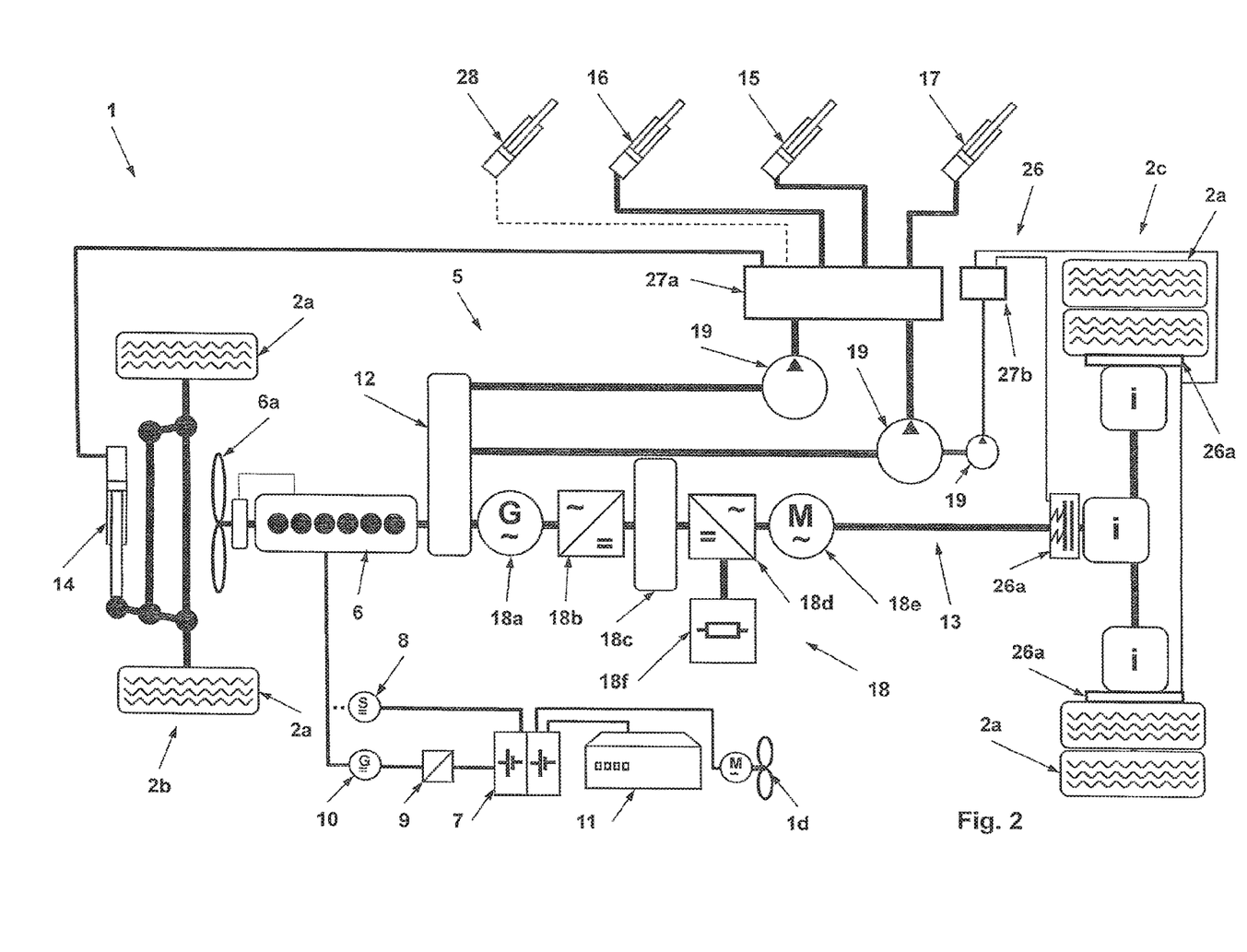
FIG. 2 shows a schematic illustration of a first embodiment of a power train of the heavy-duty lift truck of FIG. 1.

FIG. 2 shows a schematic illustration of a first embodiment of a power train 5 of the heavy-duty lift truck 1 of FIG. 1. By means of the power train 5 numerous functions of the heavy-duty lift truck 1 and in particular numerous functions of the mast 3 thereof can be driven and the drives respectively provided for this purpose can be supplied with the necessary power.

On the input side, the power train 5 comprises an internal combustion engine, preferably designed as a diesel engine 6, with a temperature-controlled fan 6a. The diesel engine 6 can be started via a starter 8 connected to a starter battery 7. Furthermore, the diesel engine 6 is mechanically connected to a dynamo 10 in order to drive same. Furthermore, the dynamo 10 is connected by means of an electrical connection via a charging regulator 9 to the starter battery 7 in order to be supplied by same. The starter battery 7 also supplies electrical power to a vehicle computer 11 of the heavy-duty lift truck 1 and further electric motor-driven fans 1d.

In order to be able, by means of the power train 5, to drive and actuate the functions of the heavy-duty lift truck 1 described in more detail below, the power train 5 also comprises a power take-off gear 12 connected at the output side to the diesel engine 6. The following functions are each brought about by a dedicated drive which is operatively connected to the power train 5 via the power take-off gear 12. In particular, the power train 5 comprises a travelling drive 13 for the "travelling" function, and, as further drives, a steering drive 14 connected to the rear axle 2b designed as a steering axle for the "steering" function, a tilting drive 15 (see also FIG. 1) for the "mast tilting" function in relation to the mast 3, a lifting drive 16 for the "lifting" function in relation to the load picking-up means or the spreader frame 4, and various additional drives 17 for several other additional functions of the spreader frame 4. A first additional function is "side shift", wherein, by means of one of the additional drives 17, the spreader frame 4 can be displaced in the direction of its longitudinal extension and therefore substantially transverse to the travel direction of the heavy-duty lift truck 1 in and parallel with the longitudinal extension of a container to be picked up, in order to cause the spreader frame 4 to cover the corner fittings of the container. Then, by means of a second additional "twist locks" function, by means of a further additional drive 17, the twist locks can be locked. The above-described gripping of the container by means of a spreader frame 4 designed as a double box spreader also takes place via a corresponding additional drive 17 which can be identical to that provided for the second additional function. A third additional function is "telescoping", for which purpose the ends of the spreader frame 4 which oppose one another in the longitudinal extension of the spreader frame 4 are designed to telescope. By means of corresponding additional drives 17 the telescoping ends can be extended and retracted in particular in the direction of the longitudinal extension of the spreader frame 4 in order thus to adjust the spreader frame 4 to different sizes, and in particular lengths, of containers to be picked up. In the case of ISO-containers, lengths of e.g. 20, 30, 40 or 45 feet are common. If the load picking-up means has fork arms, the distance between the fork arms with respect to each other can in an analogous manner be adjusted by means of the additional drives 17.

In order to brake the heavy-duty lift truck 1 from a travelling movement or to bring it to a standstill or keep it at a standstill, a "braking" function is provided. In order to bring about the "braking" function, in the region of the front axle 2c designed as the driving axle, brakes 26a, in particular a respective brake 26a, are disposed on the wheels 2a and on the differential gear, these brakes being operated via a braking drive 26. In order to support the "braking" function in the case of a stationary heavy-duty lift truck 1, e.g. when a container is being picked up or set down, "axle locking" as an optional function can be additionally provided via a locking drive 28 operatively connected to the power train 5, by means of which locking drive the rear axle 2b and/or the front axle 2c can be locked when the heavy-duty lift truck 1 is stationary.

In contrast to the case of conventional heavy-duty lift trucks 1, the travelling drive 13 connected to the output of the power take-off gear 12 no longer comprises a converter with an automatic transmission for the "travelling" function in the first embodiment in accordance with the invention. Instead of this, the travelling drive 13 has an electric drive unit and is therefore at least partially electric, in particular, diesel-electric. The electric drive unit has an assembly 18 disposed between the power take-off gear 12 and the driving axle. The assembly 18 comprises a direct voltage supply bus 18c, also referred to as a DC bus, a first inverter 18d, a first electric motor 18e preferably designed as a three-phase asynchronous motor, and a braking resistor 18f for absorption of superfluous power in the case of generative braking operation of the first electric motor 18e. Both the first electric motor 18e and also the braking resistor 18f are connected to the direct voltage supply bus 18c via the first inverter 18d. The first electric motor 18e is in driving and mechanical operative connection with the driving axle in order to drive the wheels 2a by means thereof. By means of a synchronous generator 18a, which is operatively connected to the power take-off gear 12, and of a rectifier 18b connected thereto the electric drive unit or the assembly 18 thereof and in particular the direct voltage supply bus 18c thereof are connected to the power take-off gear 12 in order to be supplied with power or to be driven thereby.

In the first embodiment, only the travelling drive 13 is diesel-electric. The remaining further drives of the power train 5 mentioned above are diesel-hydraulic. For this reason, the steering drive 14, the tilting drive 15 (see also FIG. 1), the lifting drive 16, the optional locking drive 28 and the additional drives 17 are each designed as hydraulic drives and connected to a first hydraulic system 27a which is fed by one or a plurality of hydraulic pumps 19. In this connection, the hydraulic pumps 19 are connected to the power take-off gear 12 operatively connected to the diesel engine 6 and can be driven thereby. For the braking drive 26 a second hydraulic system 27b independent of the first hydraulic system 27a is provided with a hydraulic pump 19 which is likewise driven via the power take-off gear 12.

Since the power consumption of the "travelling" function or of the travelling drive 13 in conventional diesel-driven heavy-duty lift trucks is about 70 percent of the total power consumption of all functions driven by the power train 5, the use of a diesel-electric travelling drive 13 as described above means that the degree of energy efficiency of the heavy-duty lift truck 1 can be improved considerably.

Figure 3:
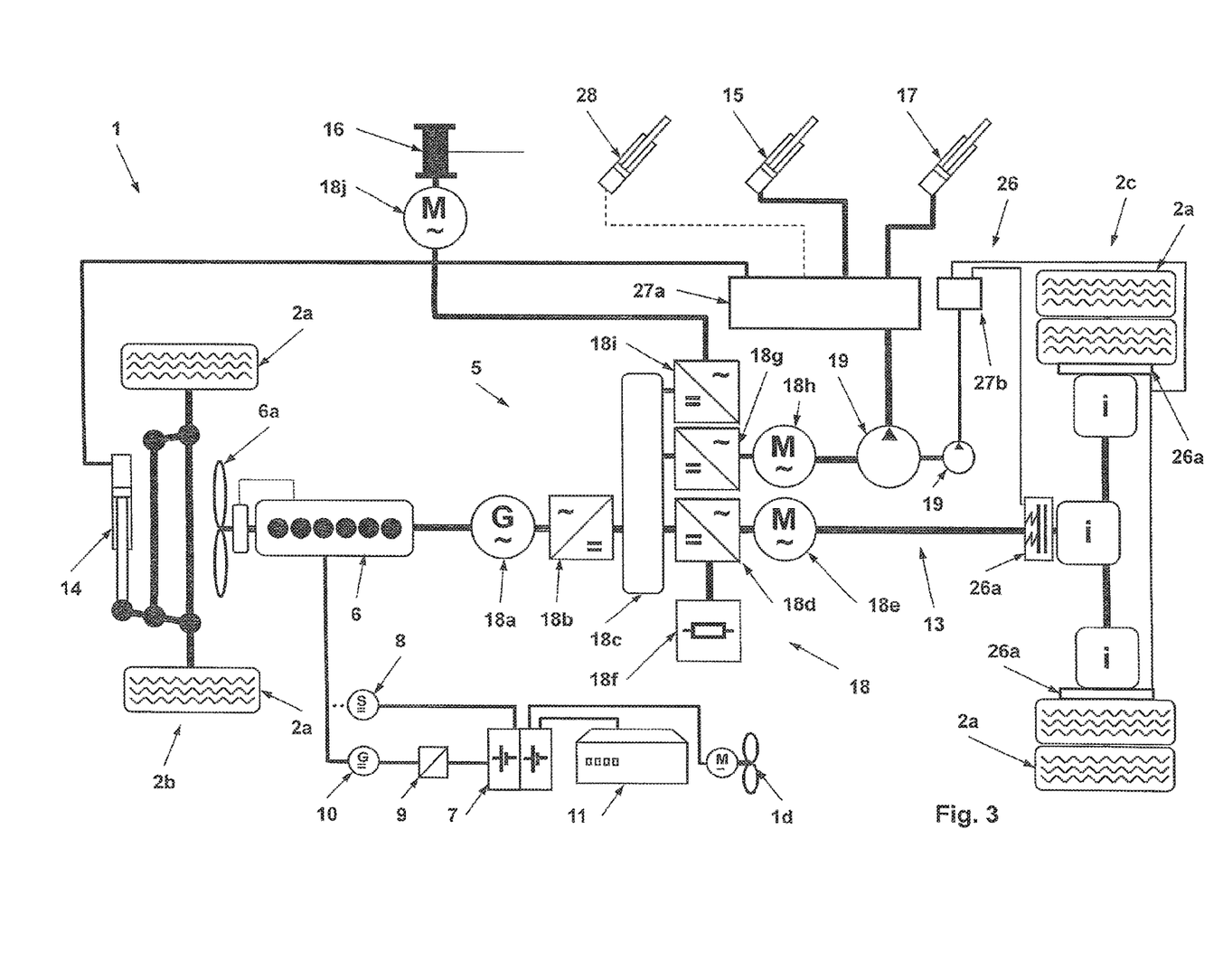
FIG. 3 shows a schematic illustration of a second embodiment of a power train of the heavy-duty lift truck of FIG. 1.

FIG. 3 shows a schematic illustration of a second embodiment of a power train 5 of the heavy-duty lift truck 1 of FIG. 1. The power train 5 in the second embodiment corresponds to the first embodiment apart from the differences described below.

In the second embodiment, the power take-off gear 12 provided in the first embodiment is omitted. Furthermore, in addition to the travelling drive 13, the further drives are partially electric and are connected to the direct voltage supply bus 18c. For this purpose, the power train 5 comprises a further electric drive unit with a second electric motor 18h preferably designed as a three-phase asynchronous motor, and a second inverter 18g via which the second electric motor 18h is connected to the direct voltage supply bus 18c. By means of the second electric motor 18h it is possible to actuate and drive one or a plurality of hydraulic pumps 19 for the two hydraulic systems 27a, 27b and therefore for the steering drive 14, the tilting drive 15, the lifting drive 16, the locking drive 28 and/or the additional drives 17.

In addition, as shown in FIG. 3, in the case of the second embodiment, the lifting drive 16 can also comprise a dedicated electric drive unit in order to replace the hydraulic drive provided for this purpose in the first embodiment. In this case, the electric drive unit of the power train 5 provided for this purpose comprises a third electric motor 18j preferably designed as a three-phase asynchronous motor, and a third inverter 18i via which the third electric motor 18j is connected to the direct voltage supply bus 18c. By means of the third electric motor 18j, instead of a hydraulic drive with a hydraulic pump 19, a lifting device or the lifting means thereof, designed e.g. as a cable, chain or belt, is driven in order to raise and/or lower the load picking-up means. The lifting drive 16 is therefore designed without hydraulic means as a diesel-electric drive.

Figure 4:
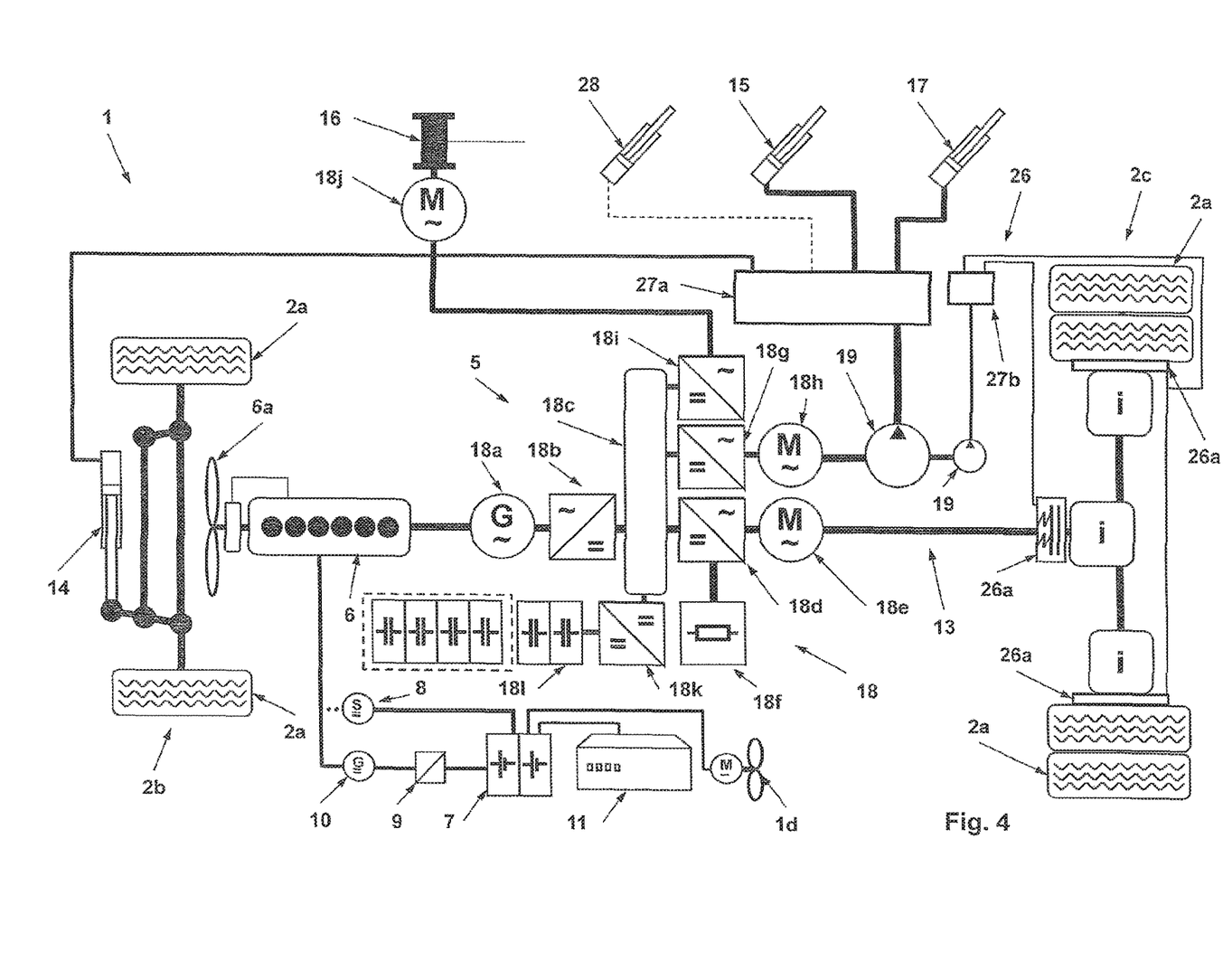
FIG. 4 shows a schematic illustration of a third embodiment of a power train of the heavy-duty lift truck of FIG. 1.

FIG. 4 shows a schematic illustration of a third embodiment of a power train 5 of the heavy-duty lift truck 1 of FIG. 1. For the third embodiment, the statements made above in relation to the second embodiment apply analogously. However, in addition, a direct current power controller 18k and at least one capacitor designed as an ultra-cap 181 are provided, which capacitor is connected to the direct voltage supply bus 18c via the direct current power controller 18k in order to be able to store recovered braking power which is fed to the direct voltage supply bus 18c during generative braking of the electric motors 18e, 18h and/or 18j.

Figure 5:
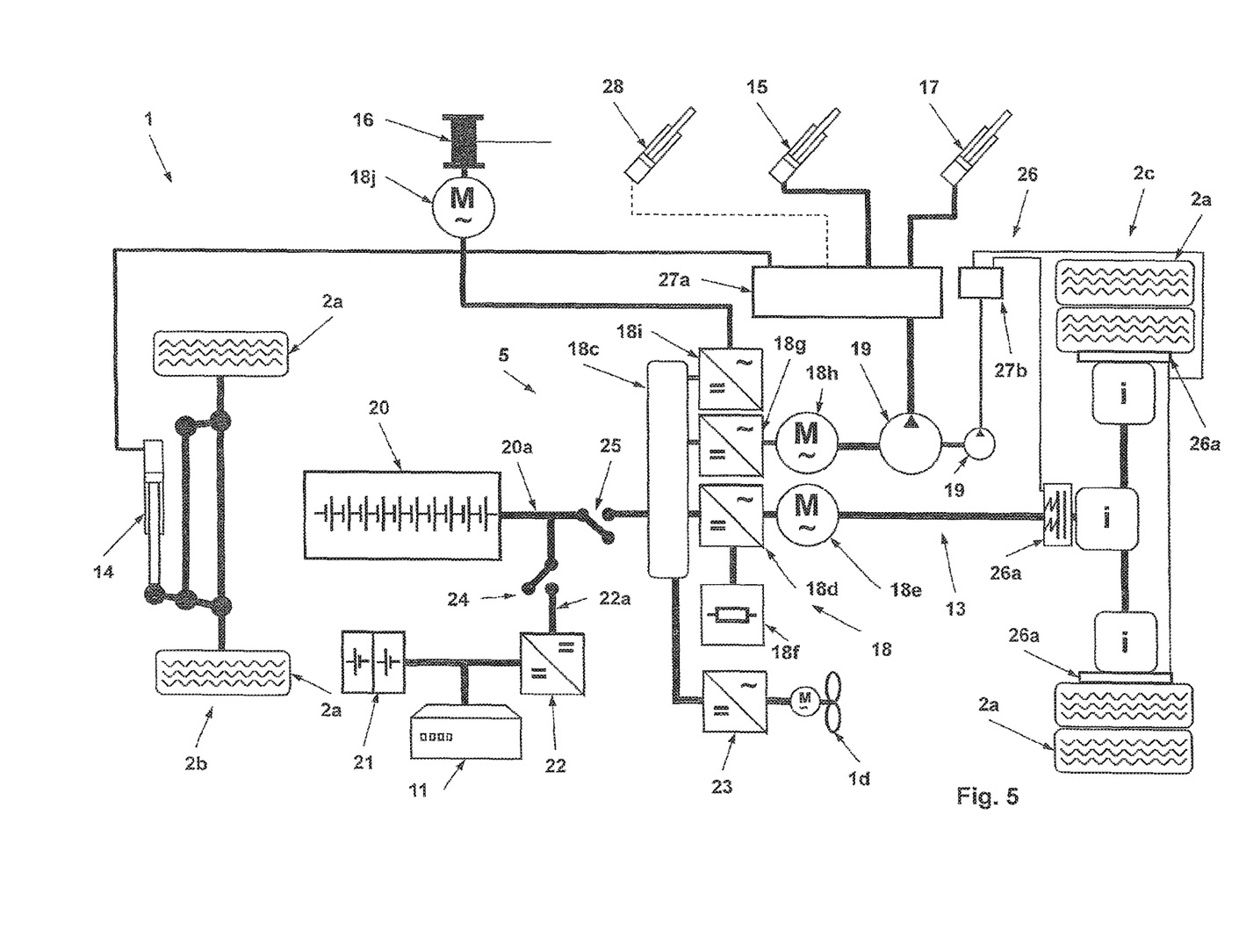
FIG. 5 shows a schematic illustration of a fourth embodiment of a power train of the heavy-duty lift truck of FIG. 1.

FIG. 5 shows a schematic illustration of a fourth embodiment of a power train 5 of the heavy-duty lift 1 truck of FIG. 1. Compared with the previous embodiments, the diesel engine 6 has been omitted and replaced by a battery preferably designed as a lead battery 20. In this way, the assembly 18 and the further electric drive units in the fourth embodiment are supplied with electric power without a synchronous generator 18a and without a rectifier 18b. For this purpose, the direct voltage supply bus 18c is connected directly to the lead battery 20 via a corresponding first electric line 20a. Owing to the omission of the diesel engine 6, in the fourth embodiment no starter battery 7, starter 8, charging regulator 9 or dynamo 10 are now required. In place thereof, a system battery 21 and a direct current power controller 22 are provided. In this connection, both the system battery 21 and also the vehicle computer 11 are connected to the direct current power controller 22 which in turn is connected to the first electric line 20a via a second electric line 22a. The attachment of the direct current power controller 22 to the lead battery 20 and to the direct voltage supply bus 18c by means of the second electric line 22a can be severed and re-established via a switch 24. By means of a further switch 25 in the first electric line 20a, the attachment of the lead battery 20 to the direct voltage supply bus 18c can be severed and re-established. In the fourth embodiment, the electric motor-driven fans 1d are connected to the direct voltage supply bus 18c via an inverter 23.

For the direct current power controllers 18k and 22, the terms direct voltage converter or DC-DC converter and, depending on the type of conversion, boost converter or step-up converter or buck converter or step-down converter are also commonly used.

Optionally, in the case of the fourth embodiment, analogous to the third embodiment, a direct current power controller 18k and at least one capacitor, e.g. in the form of an ultra-cap 181, can be supplemented.

In the fourth embodiment, the travelling drive 13 and optionally also the lifting drive 16 are designed, as illustrated in FIGS. 3 to 5, to be fully electric and therefore without both diesel and hydraulic means. In the fourth embodiment, the further drives are electro-hydraulic without diesel means.

The above-described embodiments are also fundamentally capable of being combined with one another. For example, a combination of the first and fourth embodiments is feasible in such a way that, instead of the diesel engine 6 and the power take-off gear 12, a battery or a lead battery 20 is used as a power source, wherein the lifting drive 16 is electro-hydraulic and accordingly comprises both an electric drive unit with the components described above with the aid of FIG. 3 and also a hydraulic drive according to FIG. 2 which can be actuated by means of these components.

The invention claimed is:

1. A heavy-duty lift truck which is designed as a mast-based apparatus having a mast, wherein a load pick-up device is disposed so that it can be raised and lowered on the mast and the heavy-duty lift truck is arranged at least for a maximum load capacity of 8 t, wherein the heavy-duty lift truck comprises a power train with a travelling drive, wherein the travelling drive comprises an electric drive unit, and wherein the electric drive unit comprises an assembly with a direct voltage supply bus, an inverter connected thereto, a braking resistor connected to the inverter and an electric motor which can be actuated via the inverter and the electric motor is drivingly connected to a driving axle of the heavy-duty lift truck, and wherein the electric drive unit is connected via an electric line to a battery in order to be supplied with power, and wherein a direct current power controller is connected via a second electric line to the first electric line and a system battery and a vehicle computer are connected to the direct current power controller.

2. The heavy-duty lift truck as claimed in claim 1, wherein the electric drive unit is connected via a synchronous generator and a rectifier to an internal combustion engine in order to be supplied with power.

3. The heavy-duty lift truck as claimed in claim 2, wherein the assembly comprises a direct current power controller and a capacitor, and wherein the capacitor is connected via the direct current power controller to the direct voltage supply bus.

4. The heavy-duty lift truck as claimed in claim 3, wherein the power train comprises, as further drives, a steering drive, a tilting drive for tilting the mast, a lifting drive for raising and lowering the load pick-up device, a locking drive for locking a rear axle and/or a front axle of the heavy-duty lift truck and at least one additional drive for a function of the load pick-up device.

5. The heavy-duty lift truck as claimed in claim 4, wherein at least one of the further drives is designed as a hydraulic drive which comprises a hydraulic pump.

6. The heavy-duty lift truck as claimed in claim 4, wherein at least one of the further drives is connected to a power take-off gear.

7. The heavy-duty lift truck as claimed in claim 4, wherein at least one of the further drives comprises an electric drive unit with an inverter and an electric motor which can be actuated via the inverter and the further drive is connected via the inverter to the direct voltage supply bus.

8. The heavy-duty lift truck as claimed in claim 4, wherein the lifting drive is designed without hydraulic means and comprises an electric drive unit with an inverter and an electric motor which can be actuated via the inverter and the electric drive unit is connected via the inverter to the direct voltage supply bus and the electric motor is drivingly connected to a lifting device in order to drive the lifting device to raise or lower the load pick-up device.

9. The heavy-duty lift truck as claimed in claim 1, wherein a fan is connected to the direct voltage supply bus via an inverter.

10. The heavy-duty lift truck as claimed in claim 1, wherein the heavy-duty lift truck is designed as a container stacker, and the load pick-up device of which is designed as a spreader frame.

11. The heavy-duty lift truck as claimed in claim 1, wherein the assembly comprises a direct current power controller and a capacitor, and wherein the capacitor is connected via the direct current power controller to the direct voltage supply bus.

12. The heavy-duty lift truck as claimed in claim 1, wherein the power train comprises, as further drives, a steering drive, a tilting drive for tilting the mast, a lifting drive for raising and lowering the load pick-up device, a locking drive for locking a rear axle and/or a front axle of the heavy-duty lift truck and at least one additional drive for a function of the load pick-up device.

13. The heavy-duty lift truck as claimed in claim 2, wherein the power train comprises, as further drives, a steering drive, a tilting drive for tilting the mast, a lifting drive for raising and lowering the load pick-up device, a locking drive for locking a rear axle and/or a front axle of the heavy-duty lift truck and at least one additional drive for a function of the load pick-up device.

14. The heavy-duty lift truck as claimed in claim 10, wherein the power train comprises, as further drives, a steering drive, a tilting drive for tilting the mast, a lifting drive for raising and lowering the load pick-up device, a locking drive for locking a rear axle and/or a front axle of the heavy-duty lift truck and at least one additional drive for a function of the load pick-up device.

* * * * *